UNITED STATES PATENT OFFICE.

CHARLES G. KUMMERLANDER, OF WASHINGTON, DISTRICT OF COLUMBIA.

CARBONATED BEVERAGE AND METHOD OF MAKING SAME.

1,218,190.     Specification of Letters Patent.     Patented Mar. 6, 1917.

No Drawing.     Application filed December 22, 1916. Serial No. 138,456.

*To all whom it may concern:*

Be it known that I, CHARLES G. KUMMERLANDER, a citizen of the United States, residing at Washington, in the District of Columbia, have invented certain new and useful Improvements in Carbonated Beverages and Methods of Making Same; and I do declare the following to be a full, clear, and exact description of the invention, such as will enable others skilled in the art to which it appertains to make and use the same.

The present invention relates to the production of strongly foaming beverages, such as carbonating soft drinks, non-alcoholic beer, ale, porter and the like, and is not limited to any particular composition of the beverage. The object of the invention is to produce a beverage capable of producing, when poured out into a glass, a strongly persistent collar or head.

In serving many kinds of soft drinks, when the liquid is poured out of the bottle or other container it produces a foam or collar, but in all cases such foam or collar is non-persistent, that is to say the bubbles constituting the foam soon break up, and the drink accordingly has a flat appearance. The object of my invention is to produce a carbonated beverage free from this objection.

In carrying out my process I produce from an albuminoid material, a liquid which, when added to the beverage will aid in the production of a foam which will be much more persistent than the foam ordinarily produced from soft drinks, resembling the foam on ordinary beer. This is particularly applicable to those beverages containing syrups, sugar, dextrin or the like, with flavoring material.

In carrying out my invention, I start with a liquid containing a soluble albuminoid material, an example of such material being the whites or yolks of eggs, or the whites and yolks mixed. The following is an example of a particular procedure.

The contents of one fresh raw egg (or the white or yolk thereof alone) is beaten up or agitated, to break up the thin skins or membranes. To this is added a small amount of a suitable proteolytic enzym, such as one quarter to one half of a gram of pepsin dissolved in 25 cc. of distilled water, then added to $\frac{7}{10}$ to one gram of a suitable acid, such as tartaric acid dissolved in 10 cc. of distilled water; 5 grams of common salt is then added dissolved in 40 cc. of distilled water. Thoroughly agitate the mixture and heat up to about 100° F., holding this temperature for about an hour (more or less depending upon the strength of the enzym added), preferably agitate the mixture by shaking up the same every 15 minutes or so. The material is then diluted with distilled water up to say 500 cc., is heated to boiling, and a small amount of Irish moss is added (for example about one-tenth gram). At this stage hops or other flavoring agent may be added, one half dozen hops blossoms being a suitable quantity. The mixture is boiled for about an hour to precipitate any unconverted albumen which may be left in the mixture, after which the liquid is filtered or strained through a fine cloth or a fine wire gauze or both and is then cooled to about 32° F. and is held at this temperature for about 12 to 14 hours. The liquid is then again filtered to remove any matter which separates during this chilling operation.

The hydrolyzed egg albumen is now in solution (perhaps as proteoses and peptones) which are soluble not only in cold water (ice water) and water of ordinary room temperature, but also in boiling water. Also on account of the boiling operation the liquid is substantially sterile. This liquid can be added to soft drinks or the like at any stage of their preparation, the product from one egg being added to about two to four gallons of the beverage, depending upon the density of the foam required and upon the character of the liquid to which it is added.

As another example, after the raw egg has been hydrolyzed with pepsin or other proteolytic enzym, it may be added to the constituents of the drink to be produced, and then boiled for about an hour, such liquid containing sugars, syrups, dextrin and the like. After this, the liquid will be strained or filtered, cooled to ice temperature, again filtered, and then carbonated. This example is particularly suitable in the production of beverages similar in taste to beer, ale or porter, which require a good foam and palatefulness. The beverages thus produced can be bottled and pasteurized, so that the contents of the bottle are subjected to a temperature of 145° F. for twenty minutes.

Any desired coloring matter can of course be added.

Hydrolyzed albumen solution can be prepared as a stock solution, and can be kept for a reasonable length of time.

While in the above description I have referred to the use of eggs, I call attention to the fact that other materials containing albuminoid substances can be employed. I also desire to call attention to the fact that the proportions employed can be varied to suit particular conditions.

The foam-producing liquid, produced as above described is not necessarily added to bottled drinks, but may also be added to liquids in kegs or barrels, or in some instances may be employed at soda fountains, by pouring a suitable quantity into the glass in which the beverage is prepared at the fountain.

What I claim is:

1. The process of producing a strongly foaming beverage, which comprises adding to a liquid containing a soluble albuminoid material a relatively small amount of an active protelytic enzym, allowing said enzym to act upon the said albuminoid until a material proportion of the albuminoid has been hydrolyzed, thereafter precipitating and removing unhydrolyzed albuminoid substances and adding the resulting liquid to a carbonated beverage at any desired stage of its production.

2. A process of producing a beverage which comprises adding pepsin and acid to agitated egg liquid, maintaining at a temperature at which said pepsin is active, adding hops and diluting, boiling, cooling to about 32° F., filtering, adding to other constituents to produce a palatable carbonated beverage.

3. A process which comprises agitating the contents of eggs, adding $\frac{1}{4}$ to $\frac{1}{2}$ gram pepsin, 25 cc. of water, .7 to 1 gram tartaric acid, 5 grams sodium chlorid dissolved in 40 cc. of water, digesting at 100° F. for about 1 hour, while agitating at intervals, diluting at 500 cc., adding Irish moss, and hop blossoms, boiling, straining, cooling to about 32° F., filtering; and thereafter adding to 2 to 4 gallons of non-alcoholic beverage, and carbonating; the quantities stated being for one egg.

4. A carbonated, clear, hop-flavored non-alcoholic beverage comprising as a foam-producing and foam-stabilizing agent, a hydrolyzed albumen of animal origin.

5. A non-alcoholic carbonated beverage having foaming properties and producing a foam as stable as that of an alcoholic beer, said beverage containing hydrolyzed egg-albumen.

6. In the manufacture of non-alcoholic, carbonated beverages, the process which comprises adding a proteolytic enzym to uncoagulated egg-albumen in an acid medium, thereafter allowing the same to act at a temperature of about 100° F., to produce a product which when added to a carbonated non-alcoholic beverage will produce a persistent foam.

In testimony whereof I have hereunto set my hand in presence of two subscribing witnesses.

CHARLES G. KUMMERLANDER.

Witnesses:
J. A. GRIESBAUER,
A. B. FORTE.